United States Patent [19]

Owens

[11] 3,842,968

[45] Oct. 22, 1974

[54] SNAP-ON ATTACHMENT

[75] Inventor: Robert W. Owens, Blue Island, Ill.

[73] Assignee: Velten & Pulver Inc., Chicago Ridge, Ill.

[22] Filed: Nov. 19, 1973

[21] Appl. No.: 416,734

[52] U.S. Cl................ 198/189, 198/195, 198/197
[51] Int. Cl........................ B65g 17/00, B65g 15/30
[58] Field of Search............ 198/195, 189, 197, 176

[56] References Cited
UNITED STATES PATENTS
2,954,113  9/1960  Hibbard et al...................... 198/189
3,669,247  6/1972  Pulver................................. 198/189

Primary Examiner—Richard A. Schacher
Assistant Examiner—Jeffrey V. Nase
Attorney, Agent, or Firm—Prangley, Dithmar, Vogel, Sandler & Stotland

[57] ABSTRACT

An attachment for use with an articulated roller chain conveyor wherein the attachment has a base with spaced apart legs depending therefrom and an area of reduced thickness intermediate the legs. A reinforcing member extends across the area of reduced thickness to prevent fracture of the base during flexure thereof. Each of the legs has a recess therein shaped complementary to a pin link of the associated roller chain to trap the roller chain between the legs of the attachment.

7 Claims, 10 Drawing Figures

3,842,968

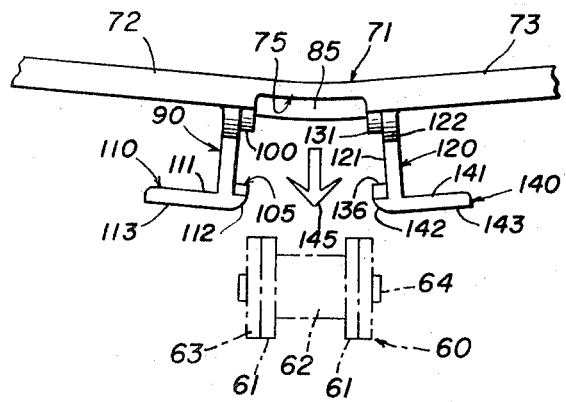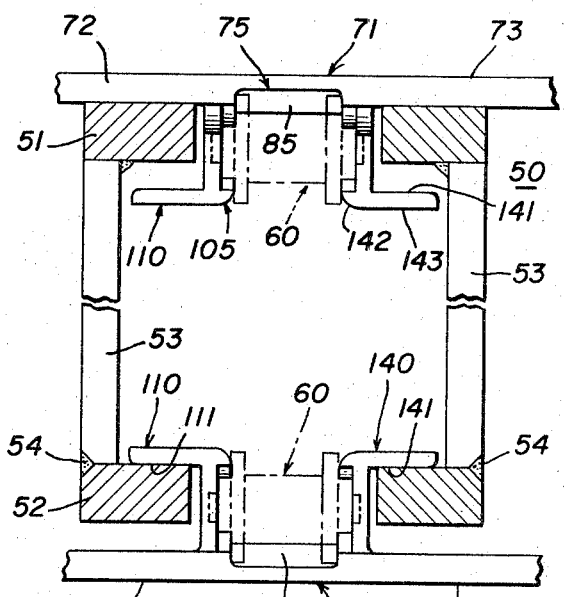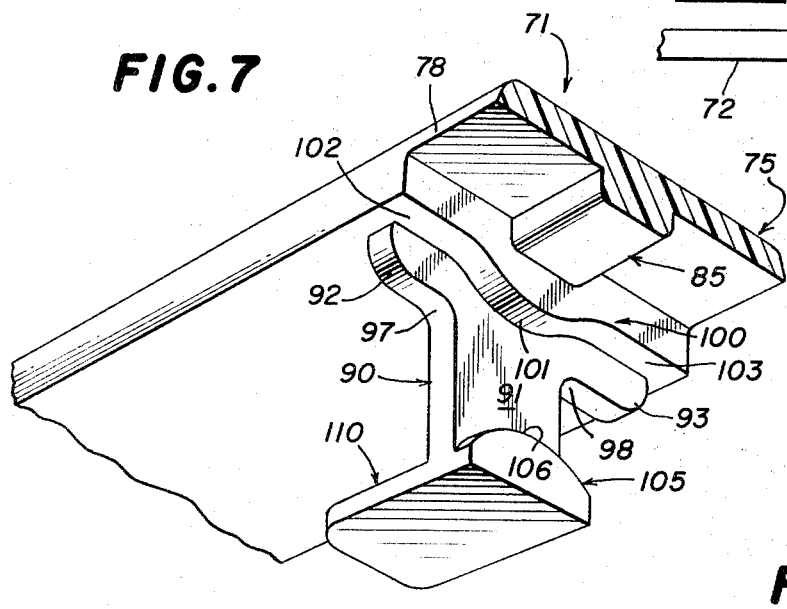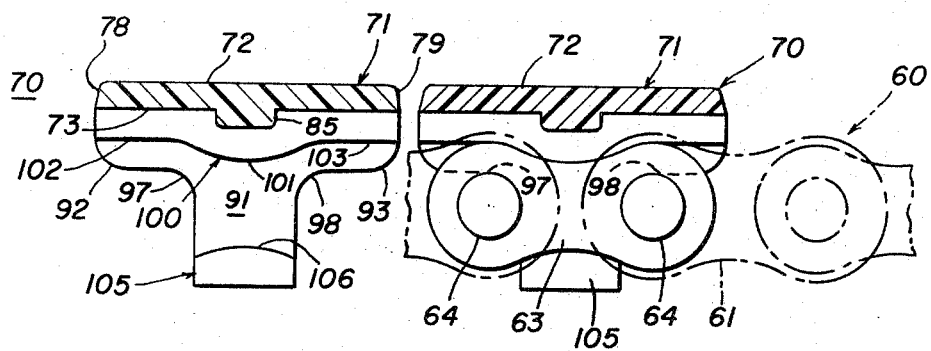

SNAP-ON ATTACHMENT

BACKGROUND OF THE INVENTION

This invention relates to an attachment for standard articulated roller chain conveyors for transporting articles. In the conveying field articulated roller chains of various configurations are used to transport articles. In the food industry it is often necessary to provide attachments connected to the roller chain conveyor to protect food from being contaminated by contact with the roller chain conveyors which are heavily oiled and greased. One such attachment is disclosed in the U.S. Pat. No. 3,669,247 for CONVEYOR SYSTEM AND ATTACHMENTS THEREFOR, issued June 13, 1972. The attachment disclosed in the above-identified U.S. Pat. is provided with spaced apart sockets for receiving therein the connecting pins of the roller chain conveyor. Where the conveyor is the type wherein the connecting pins are substantially flush with the pin links, a connection between the attachment and the conveyor depending on cooperation of the outer ends of the connecting pins with the attachment may not always be reliable. Additionally, as hereinbefore set forth, thereare many different configurations of roller chains, some of which have extended connecting pins that would require deformation of the attachment beyond the fracture point thereof in order to mount the attachment onto the associated connecting pins. The present invention deals with the above set forth difficulties in the prior art by providing an attachment which is mounted on the associated roller chain conveyor without employing the connecting pins as the principle mounting means.

SUMMARY OF THE INVENTION

This invention relates to an attachment for an articulated roller chain conveyor and more particularly to an attachment which is retained on the associated roller chain conveyor by engagement with the pin links of the conveyor.

It is a principle object of the present invention to provide an attachment for carrying articles on an articulated chain conveyor having a plurality of chain links joined together by pin links with a recess in at least one edge thereof, the attachment comprising a base having a first thickness and providing a support surface to carry articles on the associated conveyor, spaced apart legs depending from the base opposite the support surface and substantially normal thereto for mounting the attachment on the associated conveyor, the base having an area of reduced thickness between the legs to accommodate flexure of the free ends of the legs for mounting the attachment on the associated conveyor, and a reinforcing member on the area of reduced thickness opposite the support surface extending between the legs and having a limited width for reinforcing the base during flexure thereof, a recess in the inner surface of each of the legs shaped complementary to the associated pin link for receiving a pin link therein, each of the legs having a projection shaped complementary to the recess in the pin link and extending into the leg recess to fit within the recess in the pin link for trapping the pin link, whereby the legs and the recesses therein are normally spaced apart a distance sufficient to accommodate an associated pair of the pin links therebetween with the projections in position to engage and trap the associated pair of pin links in the leg recesses, bending deformation of the base in a direction away from the legs resulting in the free ends of the legs being moved apart a distance sufficient to permit the legs to be positioned astride an associated pair of pin links for engagement and trapping of the pair of pin links by the legs and the projections, subsequent bending deformation of the base in a direction away from the legs resulting in the free ends of the legs being moved apart a distance sufficient to disengage the legs and the projections from the associated pair of pin links previously engaged and trapped thereby.

Another object of the present invention is to provide an attachment of the type set forth wherein each of the legs thereof has a width less than the distance between the connecting pins of the associated pin links.

A further object of the present invention is to provide an attachment of the type set forth for use with an associated conveyor having bow shaped pin links wherein the recess in each of the legs of the attachment forms spaced apart projections shaped complementary to the bow shaped pin link to fit within the recesses in the associated pin link to trap the bow shaped pin link.

BRIEF DESCRIPTION OF THE DRAWINGS

FIG. 5 is an elevational view of the central portion of the attachment shown in FIG. 3 with the base thereof resiliently deformed to space apart the legs a distance sufficient to accommodate a conveyor chain therebetween;

FIG. 6 is a sectional view of the conveyor shown in FIG. 1 partly in elevation showing the relationship between the upper support reach and the lower support reach;

FIG. 7 is an enlarged perspective view partly in section of the attachment shown in FIG. 3 taken along lines 7—7 thereof;

FIG. 8 is an enlarged sectional view of the attachment shown in FIG. 2 particularly showing the relationship of the links of the conveyor chain with respect to the attachment;

DESCRIPTION OF THE PREFERRED EMBODIMENT

Figure 1:
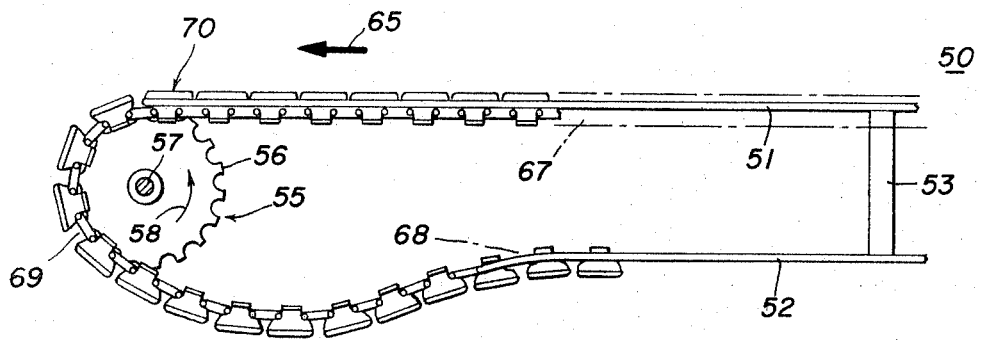
FIG. 1 is a side elevational view of a conveyor particularly showing the upper and lower support reaches thereof.
Figure 2:
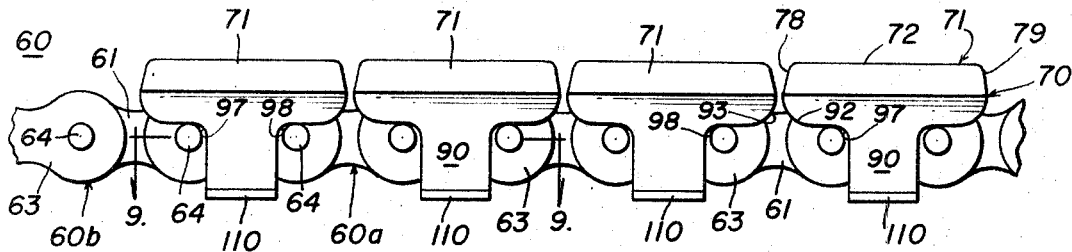
FIG. 2 is an enlarged elevational view of the support reach shown in FIG. 1 particularly illustrating the placement of the attachments thereon.
Figure 3:
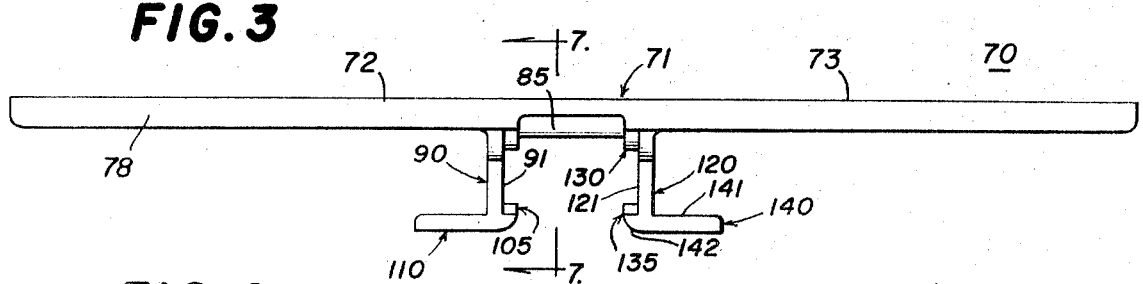
FIG. 3 is an enlarged end elevational view of one of the attachments shown in FIG. 2.
Figure 4:
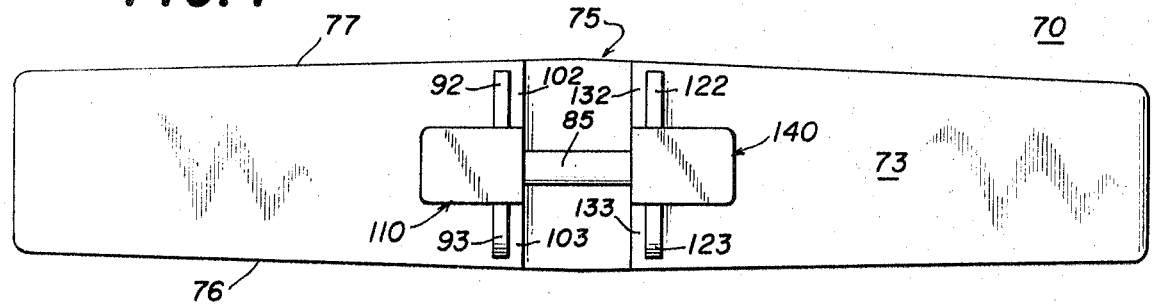
FIG. 4 is a bottom elevational view of the attachment shown in FIG. 3.
Figure 9:
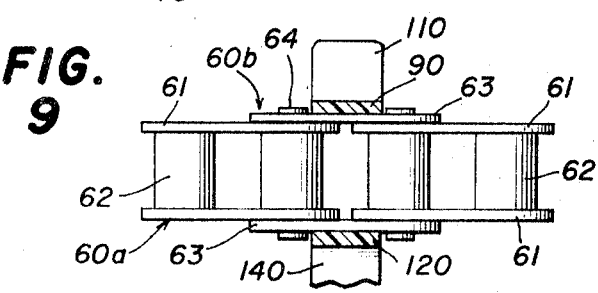
FIG. 9 is an elevational view partly in section of the conveyor chain and attachments shown in FIG. 2 as viewed along lines 9—9 thereof.

Referring now to the drawings and more particularly to FIGS. 1, 2 and 6 thereof, there is shown a conveyor 50 including spaced apart upper frame members 51 interconnecting two spaced apart lower frame members 52 by vertical posts 53. The posts 53 are welded as at 54 to both the upper frame members 51 and the lower frame members 52. A drive mechanism 55 is provided which includes a driven sprocket 56 journaled for rotation on a shaft 57. An articulated roller chain 60 includes, as seen particularly in FIGS. 2, 8 and 9, a plurality of chain links 60a formed of spaced bow shaped inner plates 61 each having two apertures (not shown) therein in which rollers 62 are journaled for rotation about the connecting pins 64. The connecting pins 64 extend through the apertures of inner plates and aligned apertures (not shown) in the associated pin link 60b formed of spaced apart bow shaped outer plates 63 thereby to connect successive chain links 60a and pin links 60b of the roller chain 60. The articulated roller chain 60 extends around the drive mechanism 55 with the sprocket 56 thereof drivably engaging the chain 60 to move the chain 60 in the direction of the arrow 65 when the sprocket 56 is driven in the direction of the arrow 58. The roller chain 60 has an upper support reach 67 and a lower support reach 68 interconnected by an inclined support reach 69 thereby to convey articles in the direction of the arrow 65 as hereinafter set forth.

Articles (not shown) are transported by the conveyor 50 on a plurality of attachments 70 each removably connected to individual ones of the pin links 60b of the roller chain 60. Each attachment 70 includes a base 71 extending in use transversely of the direction of movement of the roller chain 60, the base 71 having wings 72 and 73 extending transversely outwardly therefrom in use. The leading edges 76 of the wings 72 and 73 are tapered and the trailing edges 77 of the wings 72 and 73 are also tapered. Both the leading edge 76 and the trailing edge 77 are beveled as at 78 and 79, respectively. The base 71 has two legs 90 and 120 depending therefrom and has an area of reduced thickness 75 intermediate the legs 90 and 120. A reinforcing member 85 extends between the legs 90 and 120 and interconnects the same, the reinforcing member having a limited width or longitudinal extent, all for a purpose hereinafter set forth. The inner surface of the leg 90 has a recess 91 therein shaped complementary to the bow shaped pin link 60b to receive the pin link and to cooperate with the recesses therein. The leg 90 has a restricted width or longitudinal extent in the body portion thereof to provide outwardly extending shoulders 92 and 93 joined to the body portion of the leg 90 by substantially right angled surfaces 97 and 98, respectively. The recess 91 in the leg 90 forms spaced apart trapping members 100 and 105, the trapping member 100 including a projection 101 centered between two outwardly extending engagement surfaces 102 and 103. The trapping member 105 is shaped to provide a projection 106 having substantially the same shape as the projection 101, both the projections 101 and 106 being shaped complementary to the recesses in the bow-shaped pin links 60b.

The leg 90 has an arm 110 extending transversely thereof and outwardly therefrom, the arm 110 having a support surface 111 facing toward the associated wing 72 and a surface 113 opposite thereto and being connected to the trapping member 105 by a beveled surface 112.

The leg 120 has a recess 121 therein shaped complementary to the bow-shaped pin link 60b to receive the pin link and to cooperate with the recess therein. The leg 120 has a restricted width or longitudinal extent identical to that of the leg 90 in the body portion thereof to provide outwardly extending shoulders 122 and 123 joined to the body portion of the leg 120 by substantially right angled surfaces 127 and 128, respectively. The recess 121 in the leg 120 forms spaced apart trapping members 130 and 135, the trapping member 130 including a projection 131 between two outwardly extending engagement surfaces 132 and 133. The trapping member 135 is shaped to provide a projection 136 having substantially the same shape as the projection 131, both the projections 131 and 136 being shaped complementary to the recesses in the bow-shaped pin links 60b. The leg 120 has an arm 140 extending transversely thereof and outwardly therefrom, the arm 140 having a support surface 141 facing toward the associated wing 173 and a surface 143 opposite thereto and being connected to the trapping member 135 by a beveled surface 142.

In use, each of the individual attachments 70 is mounted on an associated pin link 60b by flexing the base 71 to spread apart the legs 90 and 120 depending therefrom to permit the introduction of the associated one of the pin links 60b between the legs. In the preferred embodiment of the invention the entire attachment 70 including the base 71, the wings 72 and 73, the reinforcement member 85, the legs 90 and 120 and the arms 110 and 140 is one piece and is constructed from a synthetic organic resin. Preferably, a polyamide such as Nylon is used to provide the requisite flex but polypropylene may also be used. The base is deformable as shown in FIG. 5 to space apart the legs 90 and 120 an amount sufficient to permit the introduction therebetween of the associated pin link 60b, the reduced area 75 in the base 71 facilitating flexing of the attachment 70 to permit the free ends of the legs 90 and 120 (that is the ends of the legs carrying the arms 110 and 140) to be spaced apart to receive therebetween an associated one of the pin links 60b. The reinforcing member 85 extends between and interconnects the legs 90 and 120 preventing fracture of the base 71 during flexure thereof when mounting the attachment 70 on the associated pin link 60b by moving the attachment in the direction of the arrow 145.

As seen from the drawings, the projections 101 and 106 fit within the opposed recesses in the associated bow-shaped pin link 60b while the engagement surfaces 102 and 103 of the leg 90 loosely contact the associated connecting pins 64 during movement of the conveyor 50 and serve as stabilizing members for limiting longitudinal rocking movement of the attachment 70 on the associated pin links 60b. An important feature of the present invention is the restricted width or longitudinal extent of the leg 90 whereby the body portion of the leg fits intermediate the connecting pins 64 of the associated pin links 60b. Due to the fact that the projections 101 and 106 trap the associated pin link 60b therebetween and the pins 64 are engaged by the angled surfaces 97 and 98 as well as the engagement surfaces 102 and 103, the attachment 70 may be mounted on both the standard articulated chain 60 hereinbefore described and other articulated chains hereinafter set forth. As seen particularly in FIG. 6, both the base 71 and the associated wings 72 and 73 prevent contact between the articles transported and the conveyor chain 60, an important sanitation feature when food is being transported. On the return support reach 68 of the articulated chain 60, the arms 110 and 140 and more particularly the support surfaces 111 and 141, respectively, support the chain 60 and attachment 70 on the lower frame members 52 thereby preventing contamination of the base 71 and the associated wings 72 and 73.

Figure 10:
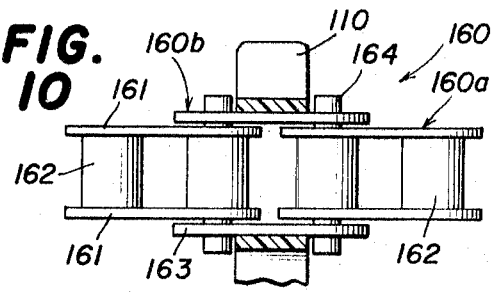
FIG. 10 is a view like FIG. 9 for a second embodiment of the roller chain conveyor.

The attachment 70 of the present invention is useful not only with the standard articulated chain 60 hereinbefore set forth wherein the ends of the connecting pin 64 are substantially flush with the pin links 60b, but also with other articulated chains such as the roller chain 160 illustrated in FIG. 10 and comprised of interconnected chain links 160a and pin links 160b. Each of the chain links 160a includes spaced apart plates 161 which may be generally rectangular in side elevation with two spaced apart rollers 162 journaled for rotation on connecting pins 164. The ends of the connecting pins 164 in the roller chain 160 extend outwardly of the associated pin links 160b. Each of the pin links 160b includes spaced apart plates 163 which are bow shaped in side elevation to provide the spaced apart recesses previously illustrated in the pin links 63 of the roller chain 60. Because the attachment 70 of the present invention is designed to trap the associated pair of pin links by engagement of the legs and the trapping members thereof with the pin links, the extended connecting pins 164 in no way affect the mounting of the attachment 70 on the associated roller chain. The construction of the present invention enables the attachments thereof to be used with chains of different configurations such as the two versions hereinbefore described, the chain 160 being particularly adapted for curving conveying paths as well as straight line conveying paths. The only requirement for successful trapping of the associated roller chain by the attachment 70 of the present invention is that at least one edge of the pin links have a recess therein for engagement by an associated trapping member on each of the legs.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. An attachment for carrying articles on an articulated chain conveyor having a plurality of chain links joined together by pin links with a recess in at least one edge thereof, said attachment comprising a base having a first thickness and providing a support surface to carry articles on the associated conveyor, spaced apart legs depending from said base opposite said support surface and substantially normal thereto for mounting said attachment on the associated conveyor, said base having an area of reduced thickness between said legs to accommodate flexure of the free ends of said legs for mounting said attachment on the associated conveyor, and a reinforcing member on said area of reduced thickness opposite said support surface extending between said legs and having a limited width for reinforcing said base during flexure thereof, a recess in the inner surface of each of said legs shaped complementary to the associated pin link for receiving a pin link therein, each of said legs having a projection shaped complementary to the recess in the pin link and extending into said leg recess to fit within the recess in the pin link for trapping the pin link, whereby said legs and the recesses therein are normally spaced apart a distance sufficient to accommodate an associated pair of the pin links therebetween with said projections in position to engage and trap the associated pair of pin links in said leg recesses, bending deformation of said base in a direction away from said legs resulting in the free ends of said legs being moved apart a distance sufficient to permit said legs to be positioned astride an associated pair of pin links for engagement and trapping of the pair of pin links by said legs and said projections, subsequent bending deformation of said base in a direction away from said legs resulting in the free ends of said legs being moved apart a distance sufficient to disengage said legs and said projections from the associated pair of pin links previously engaged and trapped thereby.

2. The attachment set forth in claim 1, wherein said attachment is a synthetic organic resin.

3. The attachment set forth in claim 1, wherein said base and said legs and said reinforcing member are one piece.

4. The attachment set forth in claim 1, and further comprising a pair of wings extending laterally outwardly of said base to provide an extended support surface with said base for carrying articles on the associated conveyor.

5. The attachment set forth in claim 1, and further comprising an arm on each of said legs extending laterally outwardly thereof to provide a surface for supporting said attachment on the associated conveyor during transportation of the attachment along a return reach of the conveyor.

6. An attachment for carrying articles on an articulated chain conveyor having a plurality of chain links joined together by pin links with a recess in at least one edge thereof, each pin link being joined to two chain links by spaced apart connecting pins, said attachment comprising a base having a first thickness providing a support surface to carry articles on the associated conveyor, spaced apart legs depending from said base opposite said support surface and substantially normal thereto for mounting said attachment on the associated conveyor, said base having an area of reduced thickness between said legs to accommodate flexure of the free ends of said legs for mounting said attachment on the associated conveyor, and a reinforcing member on said area of reduced thickness opposite said support surface extending between said legs for reinforcing said base during flexure thereof, each of said legs having a width less than the distance between the connecting pins in the associated pin links and having a recess in the inner surface thereof shaped complementary to the associated pin link for receiving the pin link therein, each of said legs having a projection shaped complementary to the recess in the pin link and extending into said leg recess to fit within the recess in the pin link for trapping the pin link, whereby said legs and the recesses therein are normally spaced apart a distance sufficient to accommodate an associated pair of the pin links therebetween with said projections in position to engage and trap the associated pair of pin links with the associated connecting pins being positioned on opposite sides of the associated leg, bending deformation of said base in a direction away from said legs resulting in the free ends of said legs being moved apart a distance sufficient to permit said legs to be positioned astride an associated pair of pin links for engagement and trapping of the pair of pin links by said legs and said projections, subsequent bending deformation of said base in a direction away from said legs resulting in the free ends of said legs being moved apart a distance sufficient to disengage said legs and said projections from the associated pair of pin links previously engaged and trapped thereby.

7. An attachment for carrying articles on an articulated chain conveyor having a plurality of chain links joined together by bow shaped pin links, said attachment comprising a base having a first thickness providing a support surface to carry articles on the associated conveyor, spaced apart legs depending from said base opposite said support surface and substantially normal thereto for mounting said attachment on the associated conveyor, said base having an area of reduced thickness between said legs to accommodate flexure of the free ends of said legs for mounting said attachment on the associated conveyor, and a reinforcing member on said area of reduced thickness opposite said support surface extending between said legs for reinforcing said base during flexure thereof, a recess in the inner surface of each of said legs shaped complementary to the bow shaped pin link for receiving a bow shaped pin link therein, each of said legs having spaced apart projections shaped complementary to the recesses in th bow shaped pin link and extending into said leg recess to fit within the recesses in the pin link for trapping the bow shaped pin link, whereby said legs and the recesses therein are normally spaced apart a distance sufficient to accommodate an associated pair of the bow shaped links therebetween with said projections in position to engage and trap the associated pair of bow shaped pin links, bending deformation of said base in a direction away from said legs resulting in the free ends of said legs being moved apart a distance sufficient to permit said legs to be positioned astride an associated pair of bow shaped pin links for engagement and trapping of the pair of bow shaped pin links by said legs and said projections, bending deformation of said base in a direction away from said legs resulting in the free ends of said legs being moved apart a distance sufficient to disengage said legs and said projections from the associated pair of bow shaped pin links previously engaged and trapped thereby.

* * * * *